Figure 9:
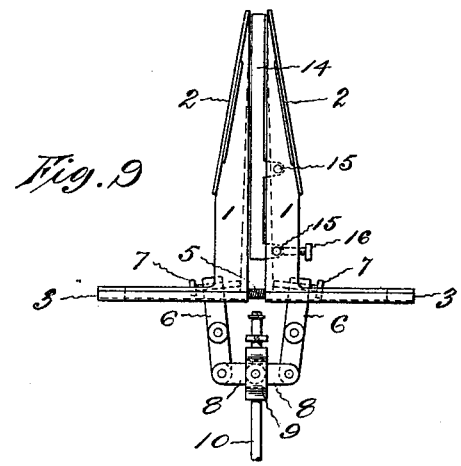

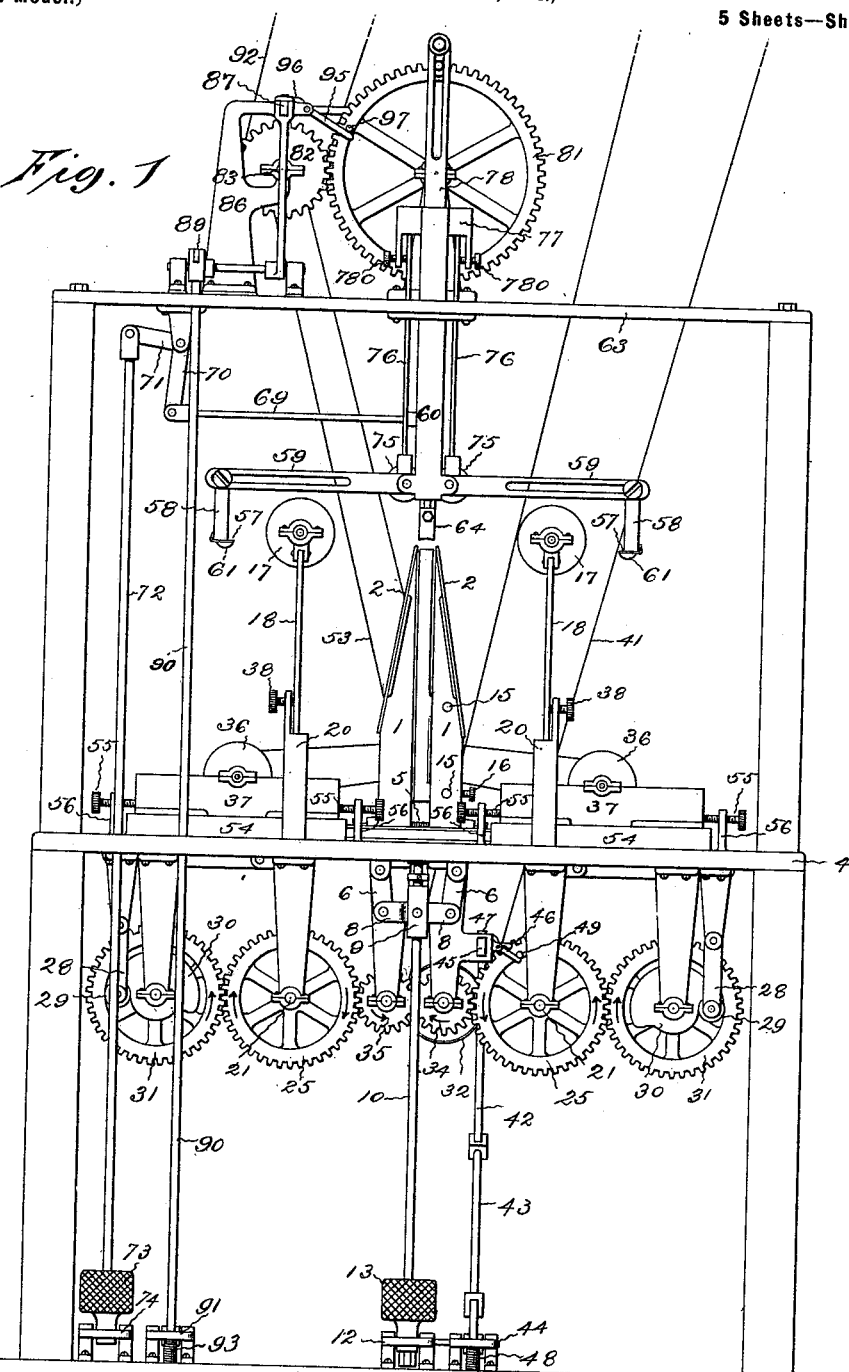

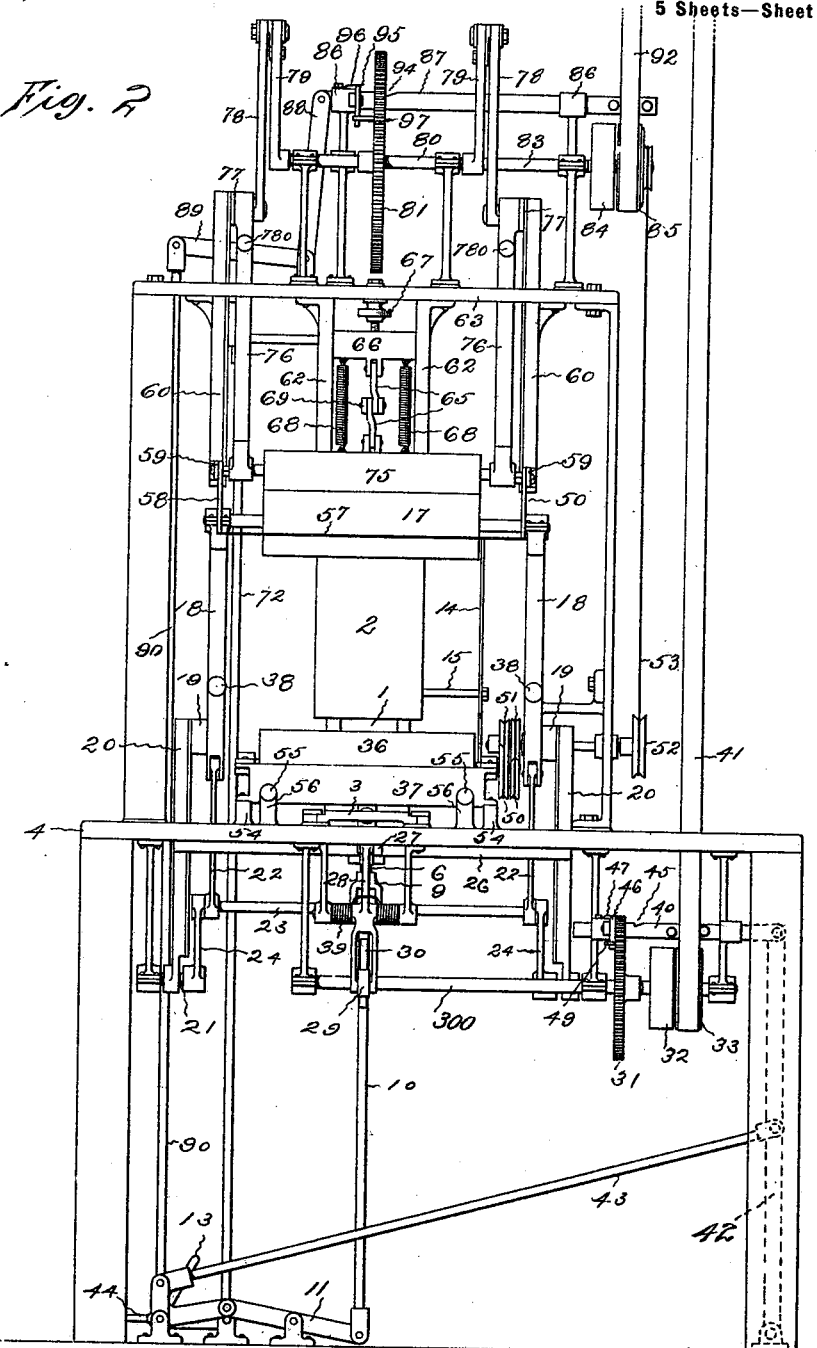

No. 672,010. Patented Apr. 16, 1901.
H. M. & H. E. PLIMPTON.
E. J. SHATTUCK, L. H. PLIMPTON & L. A. CROSSETT, Administrators of H. E. PLIMPTON, Dec'd.
MACHINE FOR CASING-IN BOOKS.
(Application filed Oct. 4, 1900.)
(No Model.) 5 Sheets—Sheet 3.
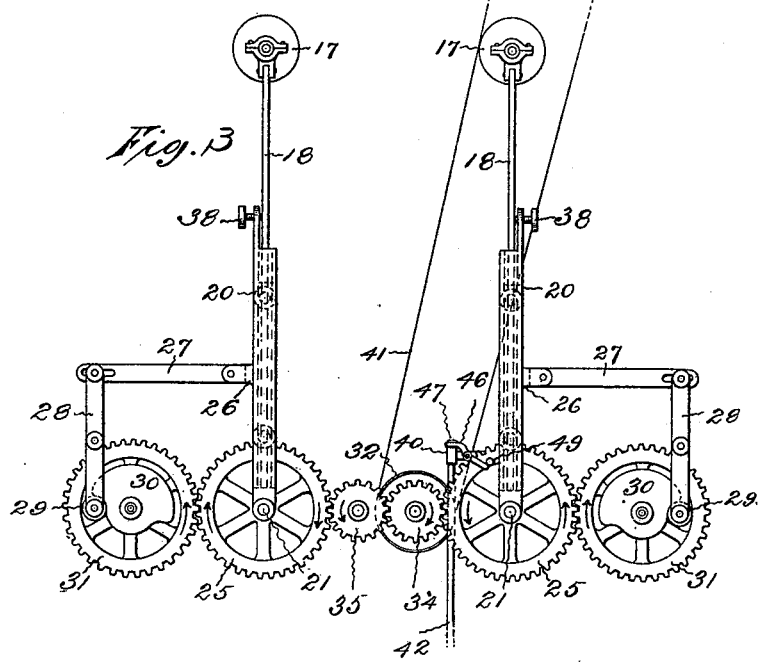
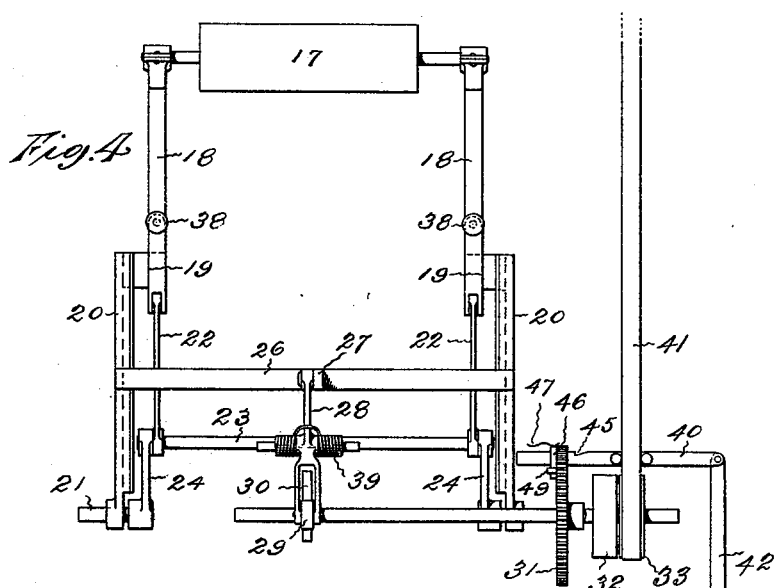

No. 672,010. Patented Apr. 16, 1901.
H. M. & H. E. PLIMPTON.
E. J. SHATTUCK, L. H. PLIMPTON & L. A. CROSSETT, Administrators of H. E. PLIMPTON, Dec'd.
MACHINE FOR CASING-IN BOOKS.
(Application filed Oct. 4, 1900.)
(No Model.) 5 Sheets—Sheet 4.

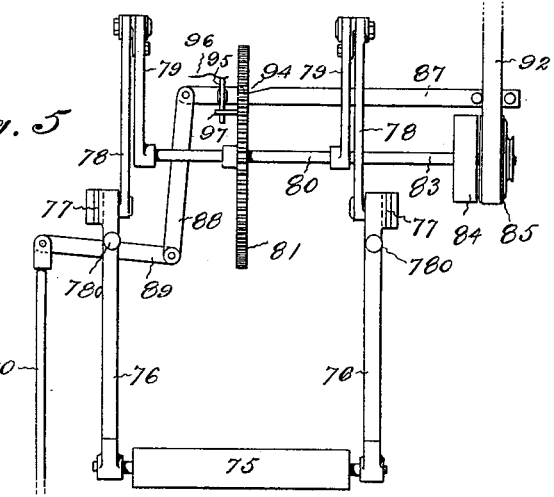

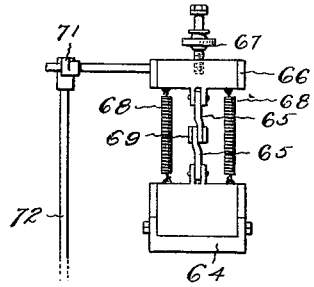

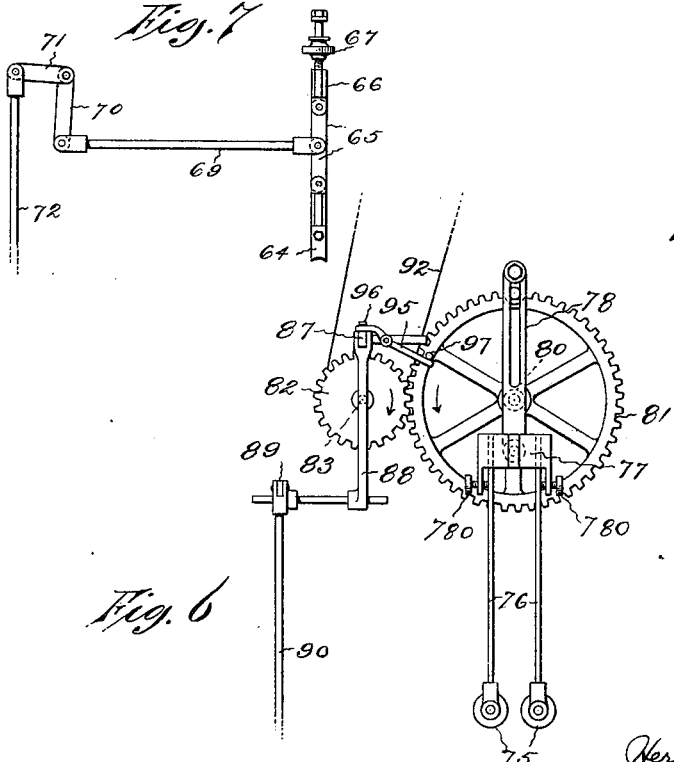

Witnesses:
V. R. Holcomb.
C. E. Buckland.

Inventors
Herbert M. Plimpton and
Howard E. Plimpton, Dec's.
E. J. Shattuck
L. H. Plimpton and
L. A. Crossett
Administrators
by Harry R. Williams, atty.

THE NORRIS PETERS CO., PHOTO-LITHO., WASHINGTON, D. C.

No. 672,010. Patented Apr. 16, 1901.
H. M. & H. E. PLIMPTON.
E. J. SHATTUCK, L. H. PLIMPTON & L. A. CROSSETT, Administrators of H. E. PLIMPTON, Dec'd.
MACHINE FOR CASING-IN BOOKS.
(Application filed Oct. 4, 1900.)

(No Model.) 5 Sheets—Sheet 5.

Witnesses:
V. R. Holcomb.
C. E. Buckland.

Inventors
Herbert M. Plimpton and
Howard E. Plimpton, Dec'd.
E. J. Shattuck,
L. H. Plimpton and
L. A. Crossett
Administrators
by Harry R. Williams
atty.

UNITED STATES PATENT OFFICE.

HERBERT M. PLIMPTON, OF NORWOOD, AND EDMUND J. SHATTUCK AND LEWIS H. PLIMPTON, OF SAME PLACE, AND LEWIS A. CROSSETT, OF NORTH ABINGDON, MASSACHUSETTS, ADMINISTRATORS OF HOWARD E. PLIMPTON, DECEASED, ASSIGNORS, BY DIRECT AND MESNE ASSIGNMENTS, TO THE SMYTH MANUFACTURING COMPANY, OF HARTFORD, CONNECTICUT.

MACHINE FOR CASING-IN BOOKS.

SPECIFICATION forming part of Letters Patent No. 672,010, dated April 16, 1901.

Application filed October 4, 1900. Serial No. 32,043. (No model.)

*To all whom it may concern:*

Be it known that we, HERBERT M. PLIMPTON, a citizen of the United States, residing at Norwood, and HOWARD E. PLIMPTON, deceased, late a citizen of the United States and a resident of Norwood, Massachusetts, did invent certain new and useful Improvements in Machines for Casing-In Books, of which the following is a specification.

This invention relates to a machine adapted to receive and hold an unbound book while the outer surfaces of the outside leaves are coated with paste and the completed case applied and caused to adhere to the pasted outside leaves.

The object of this invention is to provide a comparatively simple machine which may be easily operated to quickly clamp the unbound book, to rapidly and evenly apply paste to the outer surfaces of the outside leaves of the clamped book, to put the case outside and cause it to adhere to the pasted leaves, and then to release the book, so that it may be removed with the case fixed in place.

The machine illustrated in the accompanying drawings has a clamp for receiving and holding the unbound book, rolls arranged to move across and apply paste to the outer surfaces of the outside leaves of the book held by the clamp, a temporary support for the case, a presser for keeping the middle of the case against the back of the clamped book, rolls adapted to fold and press the leaves of the case against the pasted leaves of the book, and means for causing these mechanisms to operate at the required times.

Figure 10:
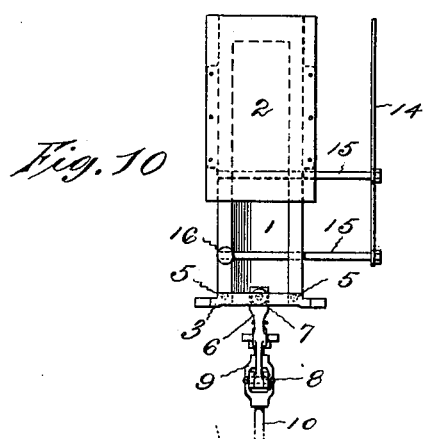
Figure 11:
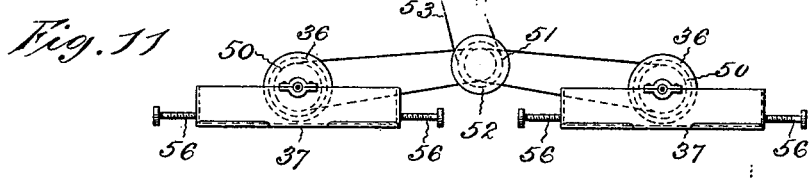
Figure 12:
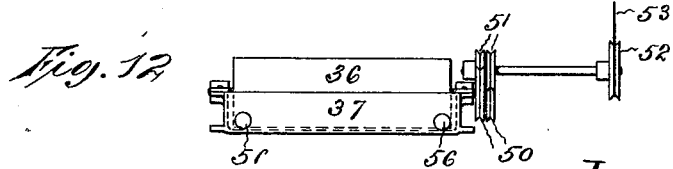

Figure 1 of the views shows a front elevation, and Fig. 2 a side elevation, of the whole machine. Fig. 3 is a front elevation, and Fig. 4 a side elevation, of the paste-applying rolls and their operating mechanisms. Fig. 5 is a side elevation, and Fig. 6 a front elevation, of the case folding and pressing rolls and their operating mechanisms. Fig. 7 is a front elevation, and Fig. 8 a side elevation, of the case-presser and its operating mechanism. Fig. 9 is a front elevation, and Fig. 10 a side elevation, of the book-clamp and its operating mechanism. Fig. 11 is a front elevation, and Fig. 12 a side elevation, of the paste boxes and rolls.

The unbound book is thrust edgewise between the vertical frames 1 of the clamp, with the outer leaves resting upon the plates 2, that are secured to the inclined backs of the frames. These frames are attached to plates 3, that are movably supported on the top of the bed-plate 4, Figs. 1 and 2. Spiral springs 5 are placed between the frames for forcing them apart. Levers 6 are pivoted to the bed-plate in such positions that screws 7, carried by the upper ends of the levers, bear against the backs of the frames. The lower ends of these levers are connected by toggle-links 8, that are, by a yoke 9, attached to a rod 10, that is connected by a lever 11 with a treadle, which has two foot-plates 12 and 13, Figs. 1, 2, 9, and 10. When the treadle is pushed in one direction, the toggle-links fold together and the upper ends of the clamp-frame levers move outwardly, so that the springs may open the clamp. Pushing the treadle oppositely straightens the toggle-links, so the upper ends of the clamp-frame levers will force the frames toward each other against the pressure of the springs and clamp a book that has been placed between the frames. The movements of the clamp-frames are adjusted by turning the screws at the upper ends of the levers, and the position of the book in the clamp is determined by the position of the gage-plate 14, that is supported by rods 15, which pass through perforations in one of the frames. The gage-plate is held at the desired position by means of a set-screw 16, that turns in the frame against one of the rods, Figs. 9 and 10.

After the book has been clamped the outer surfaces of the outside leaves, which rest upon the inclined plates, are simultaneously coated with paste. This is accomplished by two rolls 17, each mounted in bearings at the upper ends of arms 18, attached to blocks 19, that are movable vertically in ways formed in bars 20, which are pivotally supported by shafts 21, Figs. 1 and 2. Links 22 connect the blocks with crank-rods 23 at the ends of crank-arms 24 on the shafts 21. Near the rear ends the shafts 21 bear gears 25. The pivotally-supported bars 20 are joined in pairs by ties 26, which by links 27 are connected with the upper ends of levers 28, that are pivoted to brackets attached to the bottom of the bed-plate. The lower ends of these levers have rolls 29 in contact with the surfaces of cams 30, that are mounted upon shafts 300, bearing gears 31, that mesh with the gears 25. On the shaft bearing the fast pulley 32 and loose pulley 33 is a pinion 34, that meshes with one gear 25. This pinion also meshes with a pinion 35, that is in mesh with the other gear 25, Figs. 3 and 4. When the driving-pulley is rotated, the pinions, gears, and cams, through the levers and links, oscillate the ways carrying the blocks which support the paste-roll arms, and which blocks are at the same time caused to move up and down the ways by the crank-arms. The parts are so timed that the paste-rolls move toward each other until they make contact with the surfaces to be pasted, then roll down and coat those surfaces with paste, then move away, and after contact with rolls 36 in the paste-boxes 37 move upwardly into position to paste the next leaves, Figs. 1 and 2.

The planes of oscillation of the paste-applying rolls are determined by adjusting the connections between the cam-levers and the links which connect those levers with the oscillating bars, and the pressure of the rolls against the surfaces to be coated with paste is regulated by adjusting the screws 38, that pass through the blocks and bear against the roll-holding arms. Springs 39, wound about the cam-lever shafts, hold the lever-rolls against the cam-surfaces, Figs. 3 and 4.

A belt-shifter 40, supported by brackets attached to the bottom of the bed-plate, is arranged to move the belt 41 from one pulley to the other. This shifter is connected with the upper end of a lever 42, that by a rod 43 is connected with a treadle having a foot-plate 44. When this treadle is depressed, the belt-shifter transfers the belt from the loose to the fast pulley. The belt-shifter is provided with a notch 45, and arranged to engage with this notch is a lever 46, pivoted to the bracket adjacent to the gear 25. A spring 47 presses the end of this lever down upon the upper edge of the belt-shifter and a spring 48 tends to raise the treadle. Projecting from the face of one of the gears 25 is a pin 49, that at each rotation of the gear is adapted to engage the lever 46, Figs. 1 and 2. When the treadle is depressed, the shifter moves the belt upon the fast pulley and is held with the belt in that position by the dropping of the lever into the notch in the shifter. This causes the gears to rotate and the paste-rolls to be oscillated and reciprocated for the purpose of applying paste to the leaves. When the gear 25 has made one rotation, the pin 49 engages and forces the lever 46 from the notch in the shifter, allowing the spring 48 to lift the treadle and shift the belt to the loose pulley, thus stopping these mechanisms, Figs. 1, 2, 3, and 4.

The cams are so timed that when the cranks have drawn down the paste-applying rolls the rolls rest for a short time in contact with the surfaces of the rolls 36, that are held by bearings fixed to the sides of the paste-boxes 37. The shafts of these box-rolls are provided with pulleys 50, around which belts pass to pulleys 51 on a shaft provided with a pulley 52, driven by a belt 53, Figs. 11 and 12. The paste-boxes are supported by low walls 54 on the top of the bed-plate and are adjustable toward and from each other, so that the paste-applying rolls will make proper contact with the box-rolls by means of set-screws 55, turning in lugs 56, projecting upwardly from the bed-plate, Figs. 1 and 2.

The completed case is laid with its middle resting on the back of the book and its edges supported by shelves 57, that are hinged to depending arms 58, which are adjustably connected with brackets 59, attached to guide-plates 60. Springs 61 hold the shelves horizontally, but allow them to yield, so that the edges of the case may be disengaged from the shelves when the case is folded down against the pasted leaves of the book, Figs. 1 and 2. Brackets 62 are secured to the under side of the top plate 63 above the book-clamp, and movable up and down grooves in the inner faces of these brackets are the ends of a presser 64. This presser is, by toggle-links 65, connected with a bar 66, that has its ends extending into the grooves in the brackets and is movable vertically by means of an adjusting-screw 67, that is connected with the top plate. A pair of springs 68 also connects the presser with the bar, Figs. 1 and 2. When the toggle-arms are straightened out, this presser is forced down, so as to press the middle of the case to the back of the book. The degree of pressure of the presser upon the case is determined by the position of the bar, which is fixed by turning the adjusting-screw. The springs lift the presser when the toggle-links are folded, Figs. 7 and 8. The toggle-arms are connected by a link 69 with a rocker-arm 70 on the shaft that is provided with a rocker-arm 71, which by a rod 72 is connected with a treadle which has a foot-plate 73 and a foot-plate 74. When the treadle is moved in one direction, the toggle is folded and the holder lifted. When the treadle is oppositely moved, the toggle is straightened and the holder depressed toward the clamp, Figs. 1 and 2.

While the middle of the case is held to the back of the book, rolls 75 descend and fold the leaves of the case down against the pasted leaves of the book. These rolls are supported by arms 76, that are attached to blocks 77. Set-screws 780, turning in the blocks against the arms, are employed to adjust the distance of the rolls from each other. The blocks 77 are provided with tongues that are free to move vertically in the guide-plates 60, Figs. 1 and 2. A link 78 adjustably connects each of these blocks with a crank-arm 79, mounted on a shaft 80, that bears a gear 81. This gear meshes with a pinion 82 on a shaft 83, that is provided with a fast pulley 84 and loose pulley 85, Figs. 5 and 6.

Supported by brackets 86 on the top plate is a belt-shifter 87. One end of this belt-shifter is connected with a rocker-arm 88 on the shaft, having a rocker-arm 89, that by a rod 90 is connected with a treadle 91. When the treadle is depressed, the belt-shifter moves the belt 92 from the loose to the fast pulley. A spring 93 is arranged to lift the treadle and move the belt-shifter in the opposite direction, transferring the belt from the fast to the loose pulley, Figs. 1 and 2. The belt-shifter has a notch 94, and supported by one of the brackets adjacent to the gear 81 is a lever 95. A spring 96 forces one end of this lever downwardly, so that it will engage the notch when the shifter is moved, so as to transfer the belt to the fast pulley. A pin 97 projects from the face of the gear 81 in position to engage the lever and cause its end to lift from the notch after one rotation of the gear and allow the spring to move the shifter and transfer the belt to the loose pulley, thus stopping the movement of the cranks which raise and lower the folding-rolls, Figs. 1, 2, 5, and 6.

The operator first opens the outer leaves of the unbound book and slides the book edgewise between the clamp-frames, leaving the outside leaves resting on the inclined plates on the outside of the frames. Then by means of the clamp-treadle the clamp-toggles are moved so as to clamp the book between the frames. The movement of the pasting-treadle will then shift the pasting-belt so that the pasting mechanisms will operate and cause the paste-rolls to apply paste to the outer surfaces of the outside leaves. When this is completed, the belt-shifter is automatically released and the belt moved so the pasting mechanisms stop. After a case has been laid across the back edge of the book in the clamp, with the edges of the case resting upon the supporting-shelves, the presser-treadle is operated and the presser-toggles are moved so that the presser will press the middle of the case against the back of the book. Then pressure upon the folding-treadle will set the folding mechanism into operation and the folding-rolls will descend and fold and press the leaves of the case against the pasted surfaces of the outer leaves of the clamped book. The shelves holding the edges of the case yield under pressure, allowing the case-leaves to be folded down, and the folding-rolls press the case-leaves against the pasted book-leaves, so they tightly adhere. After this has been accomplished and the folding-rolls returned the driving-belt of the folding mechanism is automatically shifted and this mechanism stopped. The presser-treadle is then moved to release the pressure upon the back of the case, and finally the clamp-treadle is moved to release the book and allow it to be removed for pressing and drying.

What is claimed is—

1. A machine for casing-in books having clamping-frames, mechanism for opening and closing the frames, a gage-plate supported by one of the frames, paste-boxes, rolls mounted to rotate in the boxes, mechanism for rotating the box-rolls, paste-applying rolls, mechanism for causing the applying-rolls to engage the box-rolls and to roll along the backs of the clamping-frames, case-supports, a back-presser, mechanism for moving the back-presser toward and from the clamping-frames, folding-rolls, and mechanism for causing the folding-rolls to roll along the backs of the clamping-frames, substantially as specified.

2. A machine for casing-in books having clamping-frames, mechanism for opening and closing the frames, paste-boxes, rolls mounted to rotate in the boxes, mechanism for rotating the box-rolls, paste-applying rolls, mechanism for causing the applying-rolls to engage the box-rolls and to roll along the backs of the clamping-frames, case-supports, a back-presser, mechanism for moving the back-presser toward and from the clamping-frames, folding-rolls, and mechanism for causing the folding-rolls to roll along the backs of the clamping-frames, substantially as specified.

3. A machine for casing-in books having clamping-frames, mechanism for opening and closing the frames, paste-applying rolls, mechanism for causing the applying-rolls to roll along the backs of the clamping-frames, case-supports, a back-presser, mechanism for moving the back-presser toward and from the clamping-frames, folding-rolls, and mechanism for causing the folding-rolls to roll along the backs of the clamping-frames, substantially as specified.

4. A machine for casing-in books having clamping-frames, mechanism for opening and closing the frames, paste-applying rolls, mechanism for causing the applying-rolls to roll along the backs of the clamping-frames, a back-presser, mechanism for moving the back-presser toward and from the clamping-frames, folding-rolls, and mechanism for causing the folding-rolls to roll along the backs of the clamping-frames, substantially as specified.

5. A machine for casing-in books having clamping-frames, mechanism for opening and closing the frames, paste-applying rolls, mechanism for causing the applying-rolls to roll along the backs of the clamping-frames, folding-rolls, and mechanism for causing the folding-rolls to roll along the backs of the clamping-frames, substantially as specified.

6. A machine for casing-in books having clamping-frames, mechanism for opening and closing the frames, paste-boxes, rolls mounted to rotate in the boxes, mechanism for rotating the box-rolls, paste-applying rolls, mechanism for causing the applying-rolls to engage the box-rolls and to roll along the backs of the clamping-frames, a back-presser, mechanism for moving the back-presser toward and from the clamping-frames, folding-rolls, and mechanism for causing the folding-rolls to roll along the backs of the clamping-frames, substantially as specified.

7. A machine for casing-in books having clamping-frames, mechanism for opening and closing the frames, case-supports, a back-presser, mechanism for moving the back-presser toward and from the clamping-frames, folding-rolls, and mechanism for causing the folding-rolls to roll along the backs of the clamping-frames, substantially as specified.

8. A machine for casing-in books having clamping-frames, mechanism for opening and closing the frames, paste-boxes, rolls mounted to rotate in the boxes, mechanism for rotating the box-rolls, paste-applying rolls, mechanism for causing the applying-rolls to engage the box-rolls and to roll along the backs of the clamping-frames, a back-presser, and mechanism for moving the back-presser toward and from the clamping-frames, substantially as specified.

9. A machine for casing-in books having clamping-frames, mechanism for opening and closing the frames, paste-boxes, rolls mounted to rotate in the boxes, mechanism for rotating the box-rolls, a back-presser, mechanism for moving the back-presser toward and from the clamping-frames, folding-rolls, and mechanisms for causing the folding-rolls to roll along the backs of the clamping-frames, substantially as specified.

10. A machine for casing-in books having clamping-frames, mechanism for opening and closing the frames, paste-boxes, rolls mounted to rotate in the boxes, mechanism for rotating the box-rolls, paste-applying rolls, and mechanism for causing the applying-rolls to engage the box-rolls and to roll along the backs of the clamping-frames, substantially as specified.

11. A machine for casing-in books having clamping-frames, mechanism for opening and closing the frames, folding-rolls, and mechanism for causing the folding-rolls to run along the backs of the clamping-frames, substantially as specified.

12. A machine for casing-in books having clamping-frames, mechanism for opening and closing the frames, paste-applying means, mechanism for causing the applying means to travel along the backs of the clamping-frames, a back-presser, mechanism for moving the back-presser toward and from the clamping-frames, folders, and mechanism for causing the folders to travel along the backs of the clamping-frames, substantially as specified.

13. A machine for casing-in books having clamping-frames arranged to clamp the middle of a book between them and support the outside leaves of the book outside of them, mechanism for opening and closing the clamping-frames, paste-applying rolls, and mechanism for causing the applying-rolls to roll along the backs of the clamping-frames, substantially as specified.

14. A machine for casing-in books having clamping-frames arranged to clamp the middle of a book between them and support the outside leaves of a book outside of them, levers engaging the clamp-frames, toggle-arms connected with the levers, means for opening and closing the toggle-arms, paste-applying rolls, and mechanism for causing the applying-rolls to roll along the backs of the clamping-frames, substantially as specified.

15. A machine for casing-in books having clamping-frames arranged to clamp the middle of a book between them and support the outside leaves of a book outside of them, mechanism for opening and closing the clamping-frames, a gage-plate supported by one of the frames, paste-applying rolls, and mechanism for causing the applying-rolls to roll along the backs of the clamping-frames, substantially as specified.

16. A machine for casing-in books having clamping-frames, mechanism for opening and closing the frames, paste-boxes, rolls mounted to rotate in the boxes, mechanism for rotating the box-rolls, paste-applying rolls, cam mechanism for swinging the applying-rolls, and crank mechanism for reciprocating the applying-rolls, substantially as specified.

17. A machine for casing-in books having clamping-frames, mechanism for opening and closing the frames, paste-boxes, rolls mounted to rotate in the boxes, mechanism for rotating the box-rolls, paste-applying rolls, mechanism for oscillating the applying-rolls, mechanism for reciprocating the applying-rolls, means for driving the oscillating and reciprocating mechanisms, and means for stopping these mechanisms after each complete movement of the paste-applying rolls, substantially as specified.

18. A machine for casing-in books having clamping-frames, mechanism for opening and closing the frames, paste-applying rolls, mechanism for causing the applying-rolls to roll along the backs of the clamping-frames, a movable back-presser, toggle-arms connecting the back-presser to an adjusting-bar, and means for opening and closing the toggle-arms, substantially as specified.

19. A machine for casing-in books having clamping-frames, mechanism for opening and closing the frames, paste-applying rolls, mechanism for causing the applying-rolls to roll along the backs of the clamping-frames, movable folders, cranks connected with the folders, and means for rotating the cranks, substantially as specified.

20. A machine for casing-in books having clamping-frames, mechanism for opening and closing the frames, paste-applying rolls, mechanism for causing the applying-rolls to roll along the backs of the clamping-frames, movable folders, cranks connected with the folders, means for rotating the cranks, and means for stopping the crank mechanism after one complete movement of the folders, substantially as specified.

HERBERT M. PLIMPTON.
EDMUND J. SHATTUCK,
LEWIS H. PLIMPTON,
LEWIS A. CROSSETT,

*Administrators of the estate of Howard E. Plimpton, deceased.*

Witnesses to H. M. P.:
   WALTER F. FOSS,
   WARREN H. CUDWORTH.
Witnesses to E. J. S.:
   VOLNEY SKINNER,
   HENRY B. PATRICK.
Witnesses to L. H. P.:
   F. A. MORRILL,
   M. V. H. MORRILL.
Witnesses to L. A. C.:
   A. H. ATHERTON,
   W. H. THAYER.